(12) United States Patent
Ho (10) Patent No.: US 9,997,965 B2
(45) Date of Patent: Jun. 12, 2018

(54) STATOR STRUCTURE

(71) Applicant: ASIA VITAL COMPONENTS CO., LTD., New Taipei (TW)

(72) Inventor: Chun-Liang Ho, New Taipei (TW)

(73) Assignee: ASIA VITAL COMPONENTS CO., LTD., New Taipei (TW)

( * ) Notice: Subject to any disclaimer, the term of this patent is extended or adjusted under 35 U.S.C. 154(b) by 189 days.

(21) Appl. No.: 14/616,751

(22) Filed: Feb. 9, 2015

(65) Prior Publication Data
US 2016/0233730 A1  Aug. 11, 2016

(51) Int. Cl.
*H02K 1/14*  (2006.01)
*H02K 1/12*  (2006.01)

(52) U.S. Cl.
CPC .............. *H02K 1/146* (2013.01); *H02K 1/12* (2013.01)

(58) Field of Classification Search
CPC ............ H02K 1/146; H02K 1/06; H02K 1/08; H02K 1/12; H02K 1/14
USPC .... 310/216.091, 216.093, 216.092, 216.096, 310/216.097, 216.098, 257, 49.23, 49.25, 310/49.26, 49.27, 216.016
See application file for complete search history.

(56) References Cited

U.S. PATENT DOCUMENTS

| | | | | |
|---|---|---|---|---|
| 3,123,747 A * | 3/1964 | Glass | ..................... | H01F 41/024 310/65 |
| 4,575,652 A * | 3/1986 | Gogue | ..................... | H02K 29/03 310/156.12 |
| 4,764,697 A * | 8/1988 | Christiaens | ............ | H02K 37/18 310/112 |
| 4,902,941 A * | 2/1990 | Merkle | .............. | G11B 19/2009 29/598 |
| 5,532,531 A * | 7/1996 | Sakamoto | .............. | H02K 37/12 310/216.094 |
| 5,604,389 A * | 2/1997 | Nitta | ...................... | H02K 1/146 310/209 |
| 5,659,217 A * | 8/1997 | Petersen | ................ | H02K 1/146 310/156.26 |
| 5,780,944 A * | 7/1998 | Sakamoto | .............. | H02K 37/14 310/156.26 |
| 5,854,526 A * | 12/1998 | Sakamoto | ................ | H02K 1/14 310/162 |
| 5,949,172 A * | 9/1999 | Katagiri | .................... | H02K 1/24 29/596 |
| 6,160,330 A * | 12/2000 | Sakamoto | ................ | H02P 8/32 310/112 |
| 6,285,108 B1 * | 9/2001 | Horng | .................... | H02K 1/145 310/194 |
| 6,534,893 B2 * | 3/2003 | Horng | .................... | H02K 1/145 310/254.1 |
| 6,538,357 B2 * | 3/2003 | Horng | .................... | H02K 1/145 310/216.092 |

(Continued)

*Primary Examiner* — Burton Mullins
(74) *Attorney, Agent, or Firm* — Jackson IPG PLLC; Demian K. Jackson (57) ABSTRACT

A stator structure includes a main body. The main body has multiple poles. The poles outward extend from the main body. Each pole has a free end. An end face of the free end of the pole has an extension section normal to the main body. The extension section has multiple protrusion blocks. Each two adjacent protrusion blocks define therebetween a recess. The stator structure is able to greatly enhance the operation efficiency of the motor and lower manufacturing cost.

4 Claims, 10 Drawing Sheets

(56) References Cited

U.S. PATENT DOCUMENTS

| | | | |
|---|---|---|---|
| 7,388,313 B2* | 6/2008 | Roos | H02K 1/24 310/216.016 |
| 7,456,540 B2* | 11/2008 | Gomyo | H02K 1/146 310/216.016 |
| 8,368,278 B2* | 2/2013 | Yoshikawa | H02K 1/148 310/216.064 |

* cited by examiner

STATOR STRUCTURE

BACKGROUND OF THE INVENTION

1. Field of the Invention

The present invention relates generally to a stator structure, which is able to greatly enhance the operation efficiency of the motor and lower the manufacturing cost.

2. Description of the Related Art

In current society, a cooling fan has become a very important part of the modern electronic products ranging from small-size portable electronic device to large-size electronic equipments of transportation tool. In operation, the electronic equipment often generates high heat at the same time to affect the working performance or even lead to shutdown of the electronic equipment. Therefore, the electronic equipment is generally provided with a cooling fan to dissipate the heat and lower the temperature of the electronic equipment so as to keep the electronic equipment stably operating. The reliability and durability of the cooling fan itself are key factors of stable operation of the electronic equipment. All the current fan manufacturers strive to develop more diverse fans to satisfy different heat dissipation requirements.

Figure 1:
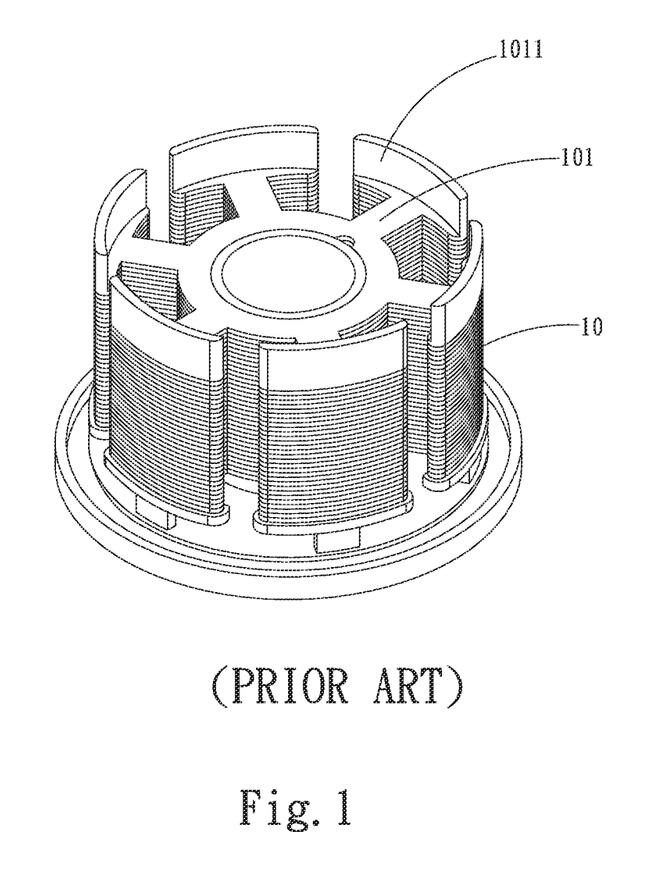
FIG. 1 is a perspective assembled view of a conventional stator structure.

A traditional fan in the market includes a stator assembly and a rotor. The fan operates in the principle of polarity change. For enhancing the operation efficiency of the fan, generally additional silicon steel sheets are stacked to increase the magnetic induction area so as to enhance the efficiency of the motor. However, the additional silicon steel sheets will lead to increase of cost. FIG. 1 is a perspective assembled view of a conventional stator structure. In this conventional stator structure, the periphery of the pole 101 of the silicon steel sheet 10 is formed with a protrusion section 1011 to increase the magnetic induction area so as to enhance the efficiency of the motor. However, this measure is likely to lead to the problem of eddy loss.

Figure 2:
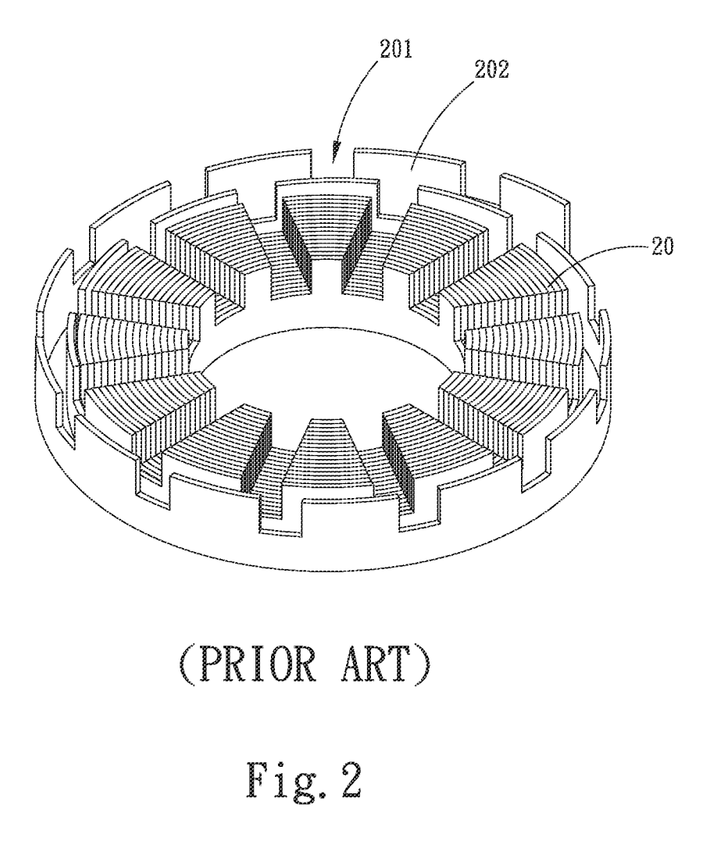
FIG. 2 is a perspective assembled view of another conventional stator structure.

Please now refer to FIG. 2, which is a perspective assembled view of another conventional stator structure. The conventional stator structure includes multiple annular silicon steel bands 20 with a set length as the magnetic poles. Each silicon steel band 20 has multiple notches 201 and protrusion plates 202. The protrusion plates 202 respectively have set widths according to the windings. The silicon steel bands 20 with the notches 201 and the protrusion plates 202 are annularly stacked and attached to each other in an eddy form. The protrusion plates 202 together form a set number of magnetic poles arranged at intervals. Therefore, it is unnecessary to stack the silicon steel sheets one by one as in the conventional stator structure. However, in manufacturing, the protrusion plates 202 of the silicon steel bands 20 must be completely aligned with each other and attached to each other. In case the protrusion plates 202 are not aligned with and attached to each other, the operation efficiency of the motor will be reversely reduced.

According to the above, the conventional stator structures have the following shortcomings:
1. The eddy loss is increased.
2. The operation efficiency of the motor is lowered.

SUMMARY OF THE INVENTION

It is therefore a primary object of the present invention to provide a stator structure, which is able to enhance the operation efficiency of the motor.

It is a further object of the present invention to provide the above stator structure, which is able to greatly lower the manufacturing cost.

It is still a further object of the present invention to provide the above stator structure, which is able to reduce eddy loss.

To achieve the above and other objects, the stator structure of the present invention includes a main body. The main body has multiple poles. The poles outward extend from the main body. Each pole has a free end. An end face of the free end of the pole has an extension section normal to the main body. The extension section has multiple protrusion blocks. Each two adjacent protrusion blocks define therebetween a recess.

According to the structural design of the present invention, in operation of the fan, the protrusion blocks formed on the extension section serve to increase the magnetic induction area of the main body to enhance the operation efficiency of the motor. In addition, the protrusion blocks and the recesses are alternately arranged to reduce eddy loss.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENTS

Figure 3:
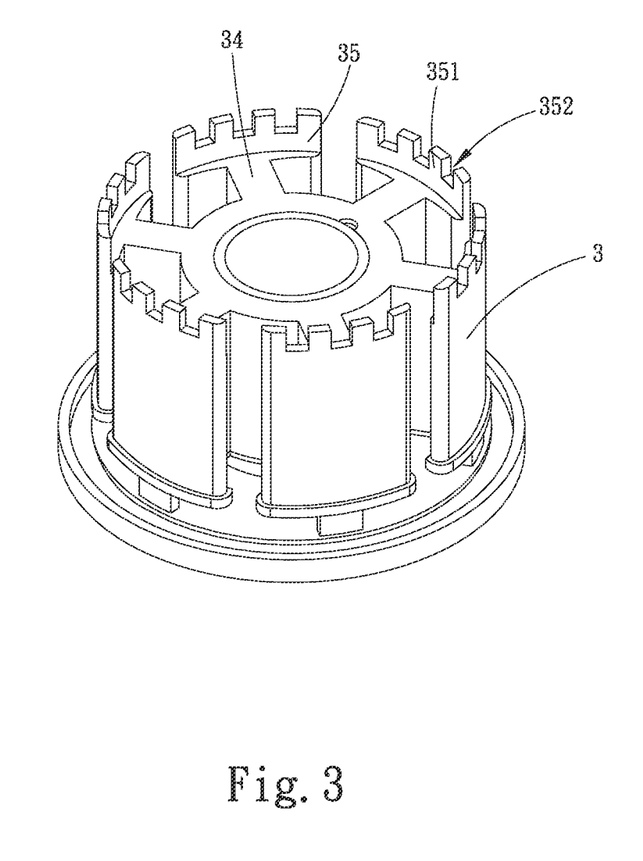
FIG. 3 is a perspective view of a first embodiment of the stator structure of the present invention.

Please refer to FIG. 3, which is a perspective view of a first embodiment of the stator structure of the present invention. According to the first embodiment, the stator structure of the present invention includes a main body 3 having multiple poles 34. The poles 34 outward extend from the main body 3. Each pole 34 has a free end. The end face of the free end of the pole 34 has an extension section 35 normal to the main body 3. The extension section 35 has multiple protrusion blocks 351. Each two adjacent protrusion blocks 351 define therebetween a recess 352. The protrusion blocks 351 and the recesses 352 are arranged at equal intervals.

According to the structural design of the present invention, in operation of the fan, the protrusion blocks 351 formed on the extension section 35 serve to increase the total magnetic induction area of the main body 3 to enhance the operation efficiency of the motor. In addition, the protrusion blocks 351 and the recesses 352 are alternately arranged to reduce eddy loss. Moreover, in manufacturing of the stator structure of the present invention, it is unnecessary to align the protrusion plates with each other and attach the protrusion plates to each other for enhancing the operation efficiency of the motor as in the conventional stator structure (as shown in FIG. 2).

Besides, according to the stator structure of the present invention, it is unnecessary to additionally stack the silicon steel sheets to enhance the operation efficiency of the motor as in the conventional stator structure. Therefore, the cost can be lowered.

Figure 4:
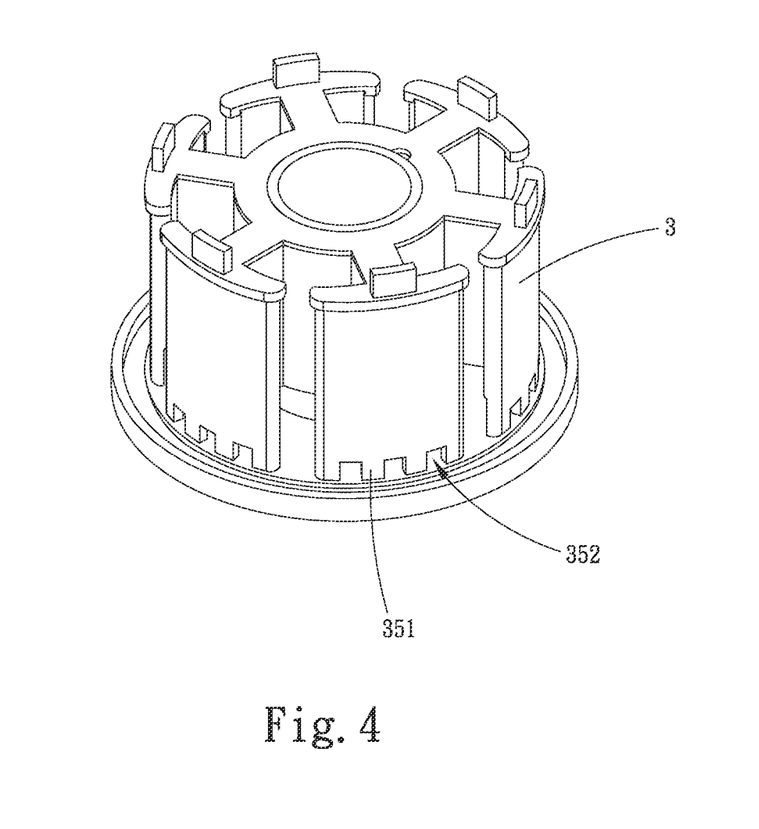
FIG. 4 is a perspective view of a second embodiment of the stator structure of the present invention.
Figure 5:
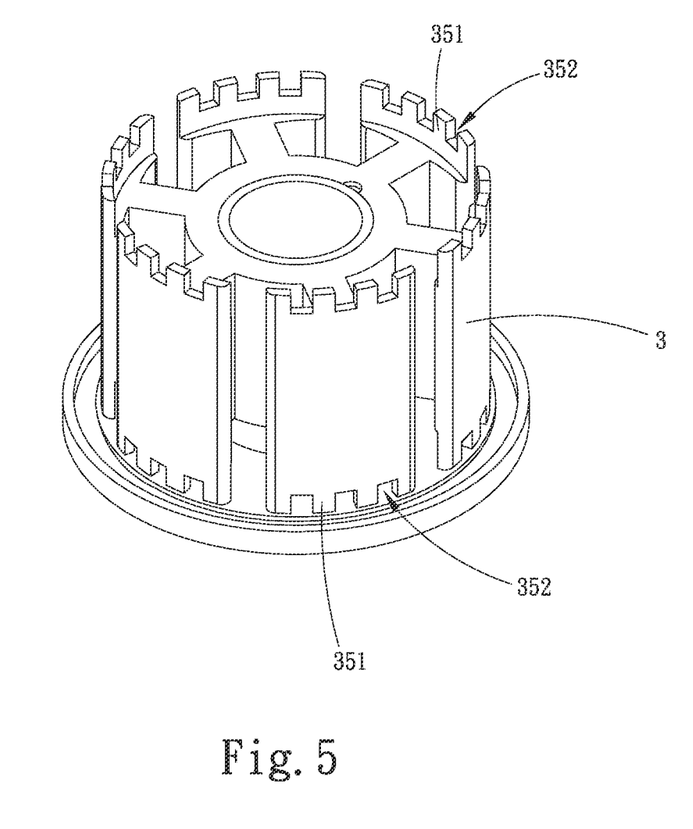
FIG. 5 is a perspective view of a third embodiment of the stator structure of the present invention.

Please now refer to FIGS. 4 and 5. FIG. 4 is a perspective view of a second embodiment of the stator structure of the present invention. FIG. 5 is a perspective view of a third embodiment of the stator structure of the present invention. The second and third embodiments are partially identical to the first embodiment is component and relationship between the components and thus will not be repeatedly described hereinafter. The second and third embodiments are different from the first embodiment in that the protrusion blocks 351 and the recesses 352 are formed on lower side of the main body 3 (as shown in FIG. 4) or the protrusion blocks 351 and the recesses 352 are formed on both the upper side and lower side of the main body 3 (as shown in FIG. 5).

Figure 6:
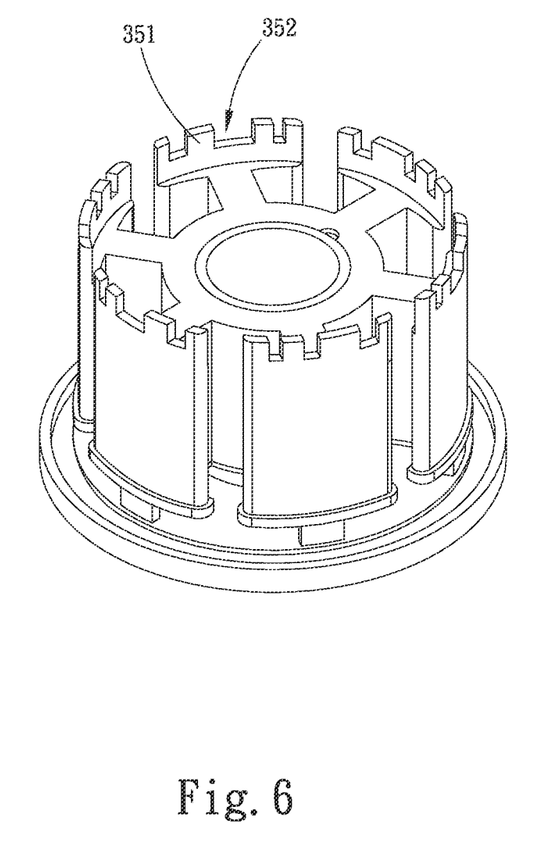
FIG. 6 is a perspective view of a fourth embodiment of the stator structure of the present invention.

Please refer to FIG. 6, which is a perspective view of a fourth embodiment of the stator structure of the present invention. The fourth embodiment is partially identical to the first embodiment is component and relationship between the components and thus will not be repeatedly described hereinafter. The fourth embodiment is different from the first embodiment in that the protrusion blocks 351 and the recesses 352 are arranged at unequal intervals. This can also enhance the operation efficiency of the motor and reduce eddy loss.

Figure 7A:
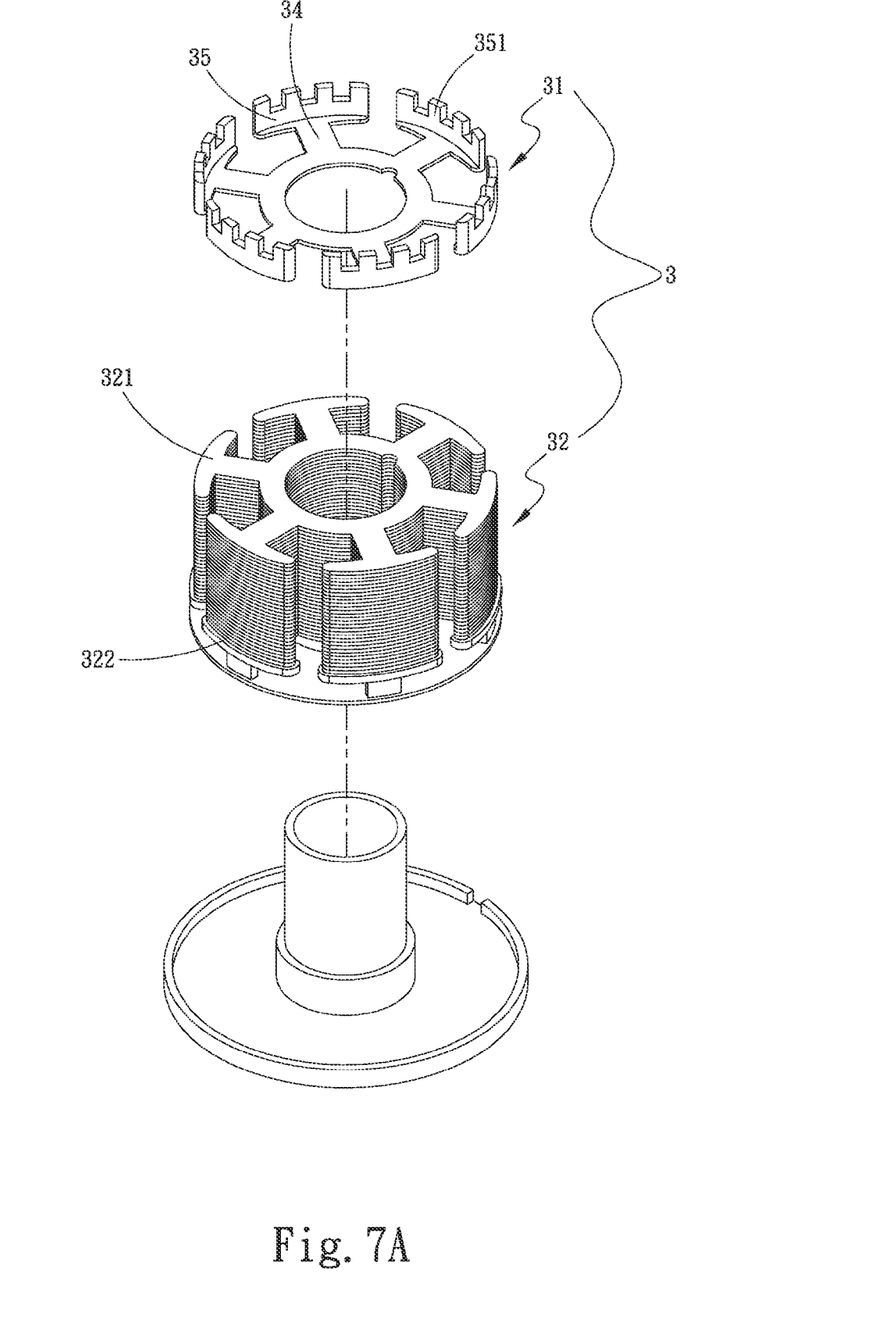
FIG. 7A is a perspective exploded view of a fifth embodiment of the stator structure of the present invention.
Figure 7B:
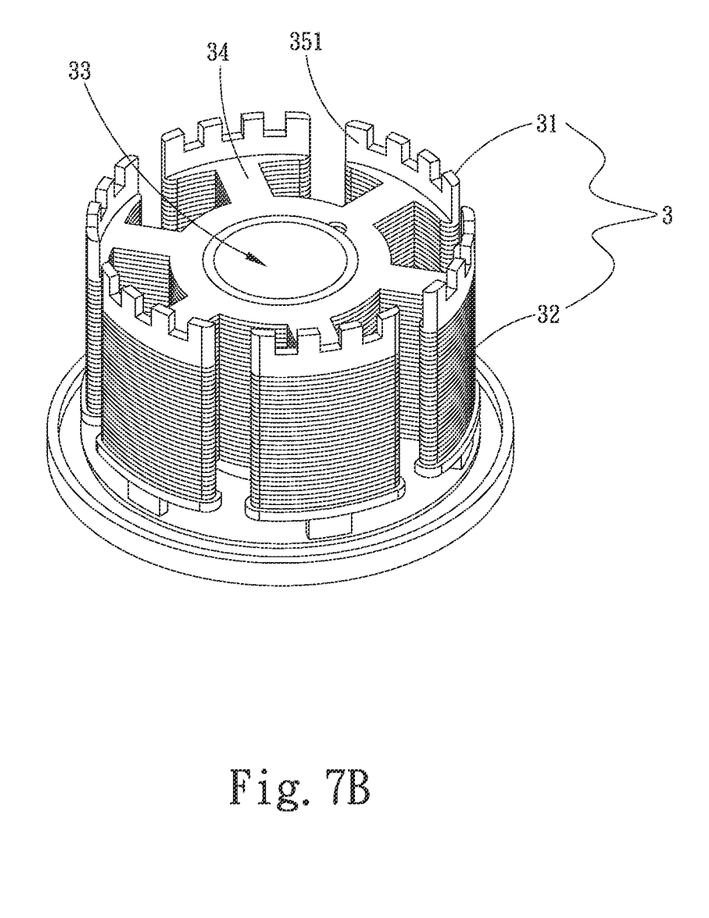
FIG. 7B is a perspective assembled view of the fifth embodiment of the stator structure of the present invention.

Please refer to FIGS. 7A and 7B. FIG. 7A is a perspective exploded view of a fifth embodiment of the stator structure of the present invention. FIG. 7B is a perspective assembled view of the fifth embodiment of the stator structure of the present invention. The fifth embodiment is partially identical to the first embodiment is component and relationship between the components and thus will not be repeatedly described hereinafter. The fifth embodiment is different from the first embodiment in that the main body 3 is composed of at least one first silicon steel sheet 31 and at least one second silicon steel sheet 32, which are stacked together. The extension sections 35 are disposed on the end faces of the free ends of the poles 34 of the first silicon steel sheet 31. The main body 3 is further formed with a through hole 33 axially passing through the first silicon steel sheet 31 and the second silicon steel sheet 32. The second silicon steel sheet 32 further has a first end face 321 and a second end face 322. The first silicon steel sheet 31 is attached to the first end face 321 of the second silicon steel sheet 32. In operation of the fan, the protrusion blocks 351 formed on the extension section 35 serve to increase the magnetic induction area so as to enhance the operation efficiency of the motor and reduce eddy loss.

Figure 8:
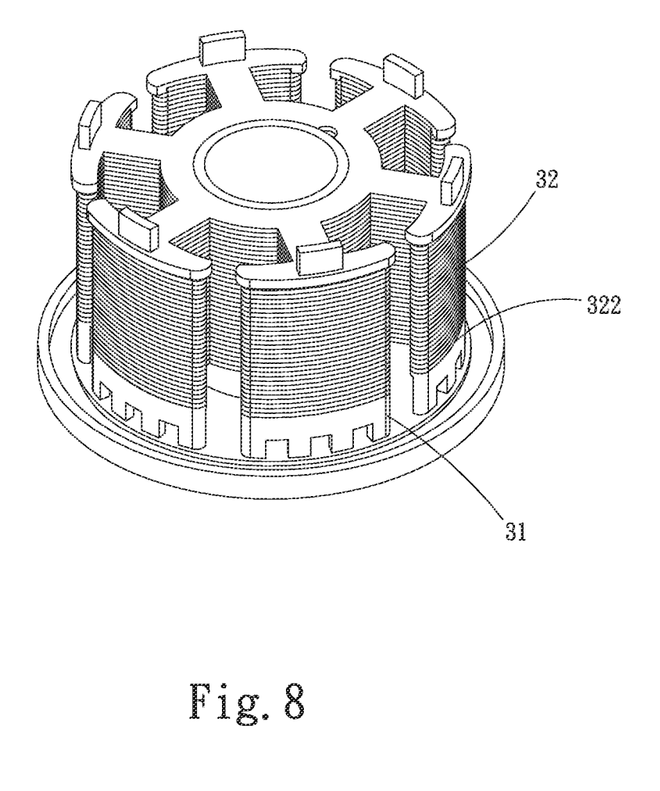
FIG. 8 is a perspective view of a sixth embodiment of the stator structure of the present invention.
Figure 9:
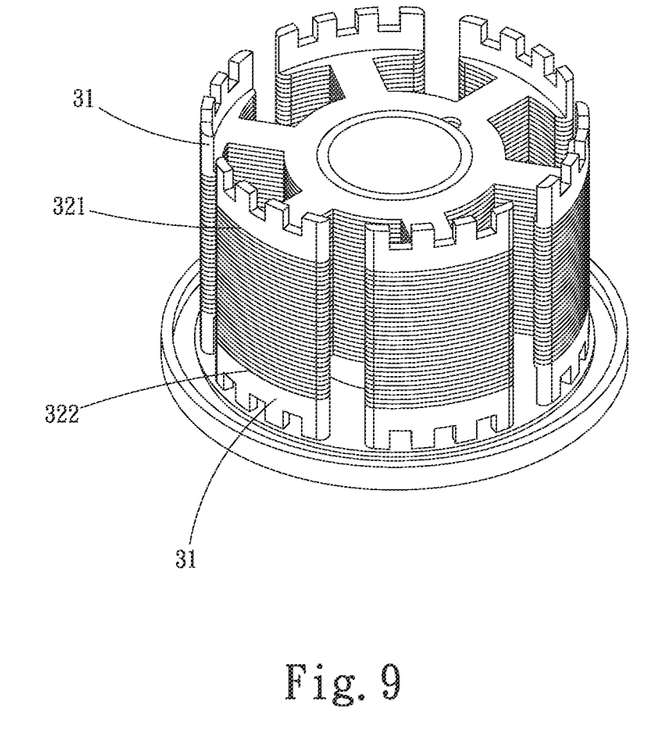
FIG. 9 is a perspective view of a seventh embodiment of the stator structure of the present invention.

Please refer to FIGS. 8 and 9. FIG. 8 is a perspective view of a sixth embodiment of the stator structure of the present invention. FIG. 9 is a perspective view of a seventh embodiment of the stator structure of the present invention. The sixth and seventh embodiments are partially identical to the fifth embodiment is component and relationship between the components and thus will not be repeatedly described hereinafter. The sixth and seventh embodiments are different from the fifth embodiment in that the first silicon steel sheet 31 is attached to the second end face 322 of the second silicon steel sheet 32 (as shown in FIG. 8) or the first silicon steel sheet 31 is attached to both the first end face 321 and the second end face 322 of the second silicon steel sheet 32 (as shown in FIG. 9). This can also enhance the operation efficiency of the motor and reduce eddy loss.

In conclusion, in comparison with the conventional stator structure, the present invention has the following advantages:
1. The operation efficiency of the motor is enhanced.
2. The eddy loss is reduced.

The present invention has been described with the above embodiments thereof and it is understood that many changes and modifications in the above embodiments can be carried out without departing from the scope and the spirit of the invention that is intended to be limited only by the appended claims.

What is claimed is:

1. A stator structure comprising at least one first silicon steel sheet and at least one second silicon steel sheet, the first and second silicon steel sheets being stacked together and each having multiple poles extending outwardly, a pole of the first silicon steel sheet having a free end, an end face of the free end of the pole extending vertically so as to form an extension section extending normal and circumferentially to the first silicon steel sheet, the extension section having multiple protrusion blocks, each two adjacent protrusion blocks defining therebetween an open recess, wherein the protrusion blocks and the respective open recess are alternately arranged at unequal intervals within each extension section so as to increase the total magnetic induction area of the main body and reduce eddy loss.

2. The stator structure of claim 1, wherein the at least one second silicon steel sheet further has a first end face and a second end face.

3. The stator structure as claimed in claim 2, comprising two first silicon sheets and wherein each first silicon steel sheet is selectively attached to the first end face or the second end face.

4. The stator structure as claimed in claim 1, further formed with a through hole axially passing through the at least one first silicon steel sheet and the at least one second silicon steel sheet.

* * * * *